United States Patent
Yokoyama (10) Patent No.: US 10,464,378 B2
(45) Date of Patent: Nov. 5, 2019

(54) RUN-FLAT RADIAL TIRE

(71) Applicant: BRIDGESTONE CORPORATION, Tokyo (JP)

(72) Inventor: Masafumi Yokoyama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 156 days.

(21) Appl. No.: 15/129,083

(22) PCT Filed: Feb. 19, 2015

(86) PCT No.: PCT/JP2015/054652
§ 371 (c)(1),
(2) Date: Nov. 7, 2016

(87) PCT Pub. No.: WO2015/151634
PCT Pub. Date: Oct. 8, 2015

(65) Prior Publication Data
US 2017/0100969 A1 Apr. 13, 2017

(30) Foreign Application Priority Data
Apr. 4, 2014 (JP) ................................. 2014-077781

(51) Int. Cl.
*B60C 17/00* (2006.01)
*B60C 19/00* (2006.01)
(Continued)

(52) U.S. Cl.
CPC ............ *B60C 17/0009* (2013.01); *B60C 3/04* (2013.01); *B60C 3/06* (2013.01); *B60C 19/001* (2013.01);
(Continued)

(58) Field of Classification Search
CPC .... B60C 2017/0063; B60C 2017/0072; B60C 2017/0054–0072; B60C 17/0009–0045
See application file for complete search history.

(56) References Cited

U.S. PATENT DOCUMENTS

| | | | | |
|---|---|---|---|---|
| 4,265,288 A | * | 5/1981 | Kaneko | ................. B60C 1/0025 152/209.1 |
| 5,494,091 A | * | 2/1996 | Freeman | ............... B60C 1/0025 152/517 |

(Continued)

FOREIGN PATENT DOCUMENTS

| DE | 102013202009 A1 | 8/2013 |
|---|---|---|
| EP | 0507184 A1 | 10/1992 |

(Continued)

OTHER PUBLICATIONS

JP,2010-269689 machine translation as provided by https://dossier1.j-platpat.inpit.go as viewed on Jun. 21, 2018 (Year: 2010).*

(Continued)

*Primary Examiner* — Jodi C Franklin
(74) *Attorney, Agent, or Firm* — Oliff PLC (57) ABSTRACT

A run-flat radial tire having a tire cross-section height of 115 mm or greater including: a carcass spanning between a pair of bead portions; a vehicle mounting direction outer side side-reinforcing rubber layer that is provided to a tire side portion at a vehicle mounting direction outer side and that extends in a tire radial direction along an inner face of the carcass; and a vehicle mounting direction inner side side-reinforcing rubber layer that is provided to a tire side portion at a vehicle mounting direction inner side and that extends in the tire radial direction along an inner face of the carcass, a tire radial direction outer side end portion of the vehicle mounting direction inner side side-reinforcing rubber layer being closer to a tire equatorial plane than a tire radial (Continued)

direction outer side end portion of the vehicle mounting direction outer side side-reinforcing rubber layer.

4 Claims, 4 Drawing Sheets

(51) Int. Cl.
| | | |
|---|---|---|
| *B60C 3/04* | (2006.01) | |
| *B60C 3/06* | (2006.01) | |
| *B60C 15/06* | (2006.01) | |

(52) U.S. Cl.
CPC ...... *B60C 15/06* (2013.01); *B60C 2017/0072* (2013.01)

(56) References Cited

U.S. PATENT DOCUMENTS

| | | | | |
|---|---|---|---|---|
| 6,237,661 | B1 * | 5/2001 | Asano | B60C 3/04 |
| | | | | 152/209.14 |
| 6,269,857 | B1 * | 8/2001 | Kanai | B60C 15/0018 |
| | | | | 152/517 |
| 6,619,354 | B1 * | 9/2003 | Kobayashi | B60C 9/08 |
| | | | | 152/517 |
| 2005/0103418 | A1 * | 5/2005 | Baran | B60C 9/20 |
| | | | | 152/517 |
| 2006/0060281 | A1 * | 3/2006 | Kirby | B60C 17/0009 |
| | | | | 152/517 |
| 2007/0121220 | A1 * | 5/2007 | Tsai | G02B 27/0012 |
| | | | | 359/754 |
| 2007/0209745 | A1 * | 9/2007 | Segawa | B60C 13/04 |
| | | | | 152/517 |
| 2009/0008014 | A1 | 1/2009 | Segawa et al. | |
| 2011/0056605 | A1 * | 3/2011 | Hottebart | B60C 9/09 |
| | | | | 152/517 |
| 2012/0234450 | A1 * | 9/2012 | Mruk | B60C 9/14 |
| | | | | 152/517 |
| 2013/0199688 | A1 | 8/2013 | Nakazaki | |
| 2015/0083296 | A1 * | 3/2015 | Asper | B60C 15/0045 |
| | | | | 152/323 |
| 2016/0250900 | A1 * | 9/2016 | Ogawa | B60C 17/0009 |
| | | | | 152/517 |

FOREIGN PATENT DOCUMENTS

| | | | | |
|---|---|---|---|---|
| JP | H06-219112 | A | 8/1994 | |
| JP | 2006-218889 | A | 8/2006 | |
| JP | 2007-001338 | A | 1/2007 | |
| JP | 2007-055481 | A | 3/2007 | |
| JP | 2008-155855 | A | 7/2008 | |
| JP | 2009-120023 | A | 6/2009 | |
| JP | 2009-126262 | A | 6/2009 | |
| JP | 2010-111172 | A | 5/2010 | |
| JP | 2010-269689 | A | 12/2010 | |
| JP | 4765483 | B2 | 9/2011 | |
| JP | 2013-177115 | A | 9/2013 | |
| WO | WO-2005072992 | A1 * | 8/2005 | ............... B60C 3/06 |
| WO | 2008/07555 | A1 | 1/2008 | |
| WO | WO 2015064136 | A1 * | 6/2014 | ......... B60C 17/0009 |

OTHER PUBLICATIONS

WO-2005072992-A1 machine translation as provided by https://patentscope.wipo.int/search/en/detail.jsf?docId=WO2005072992&tab=PCTDESCRIPTION&maxRec=1000 Mar. 2019 (Year: 2019).*

Mar. 15, 2017 Search Report issued in European Patent Application No. 15774261.0.

May 19, 2015 International Search Report issued in International Patent Application No. PCT/JP2015/054652.

Aug. 1, 2017 Search Report issued in Chinese Patent Application No. 201580026662.9.

* cited by examiner

RUN-FLAT RADIAL TIRE

TECHNICAL FIELD

The present invention relates to a run-flat radial tire.

BACKGROUND ART

As a run-flat radial tire capable of running safely for a specific distance even in a state in which the internal pressure has dropped due to puncturing or the like, a side reinforcement type run-flat radial tire is known in which tire side portions are reinforced with side-reinforcing rubber layers (see, for example, Japanese Patent Application Laid-Open (JP-A) No. 2009-126262).

SUMMARY OF INVENTION

Technical Problem

Side reinforcement type run-flat radial tires have focused on tires having a size with a comparatively small tire cross-section height. This is since when a slip angle is applied during run-flat running (when running in a state of reduced internal pressure due to puncturing or the like), a tire deformation amount increases with increasing tire cross-section height, making it difficult to achieve the levels of performance required of a run-flat radial tire.

In particular, rim detachment at a vehicle turn inner side is liable to occur in side reinforcement type run-flat radial tires with a high tire cross-section height.

It is conceivable that this rim detachment at the vehicle turn inner side could be caused by buckling (a phenomenon in which the tire side portion bends by folding in toward the tire inner side) occurring in the tire side portion at the vehicle turn inner side. Note that it would be conceivable to enlarge the side-reinforcing rubber layer as a method of improving rim detachment prevention performance; however, the tire weight would increase in this case.

An object of the present invention is to improve rim detachment prevention performance while suppressing an unnecessary increase in weight in side reinforcement type run-flat radial tires.

Solution to Problem

A run-flat radial tire of a first aspect of technology of the disclosure is a run-flat radial tire having a tire cross-section height of 115 mm or greater that includes a carcass spanning between a pair of bead portions, a vehicle mounting direction outer side side-reinforcing rubber layer that is provided to a tire side portion at a vehicle mounting direction outer side and that extends in a tire radial direction along an inner face of the carcass, and a vehicle mounting direction inner side side-reinforcing rubber layer. The vehicle mounting direction inner side side-reinforcing rubber layer is provided to a tire side portion at a vehicle mounting direction inner side and extends in the tire radial direction along an inner face of the carcass, a tire radial direction outer side end portion of the vehicle mounting direction inner side side-reinforcing rubber layer being closer to a tire equatorial plane than a tire radial direction outer side end portion of the vehicle mounting direction outer side side-reinforcing rubber layer.

The present inventors have confirmed that, when the tire cross-section height is 115 mm or greater in side reinforcement type run-flat radial tires, a large amount of bending occurs from a width direction end portion of the tread to a tire equatorial plane side portion (hereafter sometimes referred to as "close to a tread end portion") accompanying buckling of the tire side portion due to a slip angle being applied. Thus, in the run-flat radial tire of the first aspect, close to the tread end portion where the large amount of bending occurs, causing buckling to occur, the tire radial direction outer side end portion of the vehicle mounting direction inner side side-reinforcing rubber layer provided to the tire side portion at the vehicle mounting direction inner side and extending in the tire radial direction along the inner face of the carcass is closer to the tire equatorial plane than the tire radial direction outer side end portion of the vehicle mounting direction outer side side-reinforcing rubber layer provided to the tire side portion at the vehicle mounting direction outer side and extending in the tire radial direction along the inner face of the carcass. This enables rigidity to be sufficiently improved in regions close to the tread end portions, and particularly in the region close to the tread end portion at the vehicle mounting direction inner side, suppressing buckling of the tire side portion and improving rim detachment prevention performance. Making the tire radial direction outer side end portion of the vehicle mounting direction inner side side-reinforcing rubber layer closer to the tire equatorial plane than the tire radial direction outer side end portion of the vehicle mounting direction outer side side-reinforcing rubber layer enables an unnecessary increase in weight to be prevented.

A second aspect of technology of the disclosure is the run-flat radial tire of the first aspect, further including a maximum width inclined belt layer that is provided to a tire tread portion at a tire radial direction outer side of the carcass, that includes a cord extending in a direction inclined with respect to a tire circumferential direction, and that is a belt layer having the largest width in a tire axial direction, wherein a ratio L2/L1, of an overlap width L1 in the tire axial direction between the maximum width inclined belt layer and the vehicle mounting direction outer side side-reinforcing rubber layer and an overlap width L2 in the tire axial direction between the maximum width inclined belt layer and the vehicle mounting direction inner side side-reinforcing rubber layer, is set to 15/14 or greater.

In the run-flat radial tire of the second aspect, at the tire tread portion where the large amount of bending occurs, causing buckling to occur, the ratio L2/L1, of the overlap width L1 in the tire axial direction between the maximum width inclined belt layer and the vehicle mounting direction outer side side-reinforcing rubber layer and the overlap width L2 in the tire axial direction between the maximum width inclined belt layer and the vehicle mounting direction inner side side-reinforcing rubber layer, is set to 15/14 or greater. This enables rigidity to be sufficiently improved in the regions close to the tread end portions, and particularly in the region close to the tread end portion at the vehicle mounting direction inner side, suppressing buckling of the tire side portion and improving rim detachment prevention performance. This also enables an unnecessary increase in weight to be prevented.

A third aspect of technology of the disclosure is the run-flat radial tire of the first aspect or the second aspect, further including a maximum width inclined belt layer that is provided to a tire tread portion at a tire radial direction outer side of the carcass, that includes a cord extending in a direction inclined with respect to a tire circumferential direction, and that is a belt layer having the largest width in a tire axial direction, wherein an overlap width L1 in the tire axial direction between the maximum width inclined belt layer and the vehicle mounting direction outer side side-reinforcing rubber layer, and an overlap width L2 in the tire axial direction between the maximum width inclined belt layer and the vehicle mounting direction inner side side-reinforcing rubber layer are each 15% of the tire axial direction width of the maximum width inclined belt layer or greater.

In the run-flat radial tire of the third aspect, at the tire tread portions where the large amount of bending occurs, causing buckling to occur, the overlap width L1 in the tire axial direction between the maximum width inclined belt layer and the vehicle mounting direction outer side side-reinforcing rubber layer, and the overlap width L2 in the tire axial direction between the maximum width inclined belt layer and the vehicle mounting direction inner side side-reinforcing rubber layer are each 15% of the tire axial direction width of the maximum width inclined belt layer or greater. This enables rigidity to be sufficiently improved in the regions close to the tread end portions, and particularly in the region close to the tread end portion at the vehicle mounting direction inner side, suppressing buckling of the tire side portion and improving rim detachment prevention performance. This also enables an unnecessary increase in weight to be prevented.

A fourth aspect of technology of the disclosure is the run-flat radial tire of the first aspect or the second aspect, further including a maximum width inclined belt layer that is provided to a tire tread portion at a tire radial direction outer side of the carcass, that includes a cord extending in a direction inclined with respect to a tire circumferential direction, and that is a belt layer having the largest width in a tire axial direction, wherein an overlap width L1 in the tire axial direction between the maximum width inclined belt layer and the vehicle mounting direction outer side side-reinforcing rubber layer is from 5% to 14% of the tire axial direction width of the maximum width inclined belt layer, and an overlap width L2 in the tire axial direction between the maximum width inclined belt layer and the vehicle mounting direction inner side side-reinforcing rubber layer is from 5% to 40% of the tire axial direction width of the maximum width inclined belt layer.

In the run-flat radial tire of the fourth aspect of the technology of the disclosure, at the tire tread portions where the large amount of bending occurs, causing buckling to occur, the overlap width L1 in the tire axial direction between the maximum width inclined belt layer and the vehicle mounting direction outer side side-reinforcing rubber layer is from 5% to 14% of the tire axial direction width of the maximum width inclined belt layer, and the overlap width L2 in the tire axial direction between the maximum width inclined belt layer and the vehicle mounting direction inner side side-reinforcing rubber layer is from 5% to 40% of the tire axial direction width of the maximum width inclined belt layer. This enables a good balance to be achieved in suppressing an unnecessary increase in weight and improving rim detachment prevention performance and run-flat durability performance.

Advantageous Effects of Invention

The run-flat radial tire of technology of the disclosure enables rim detachment prevention performance to be improved while suppressing an unnecessary increase in weight.

DESCRIPTION OF EMBODIMENTS

Explanation follows regarding exemplary embodiments of the present invention, based on the drawings.

Figure 1:
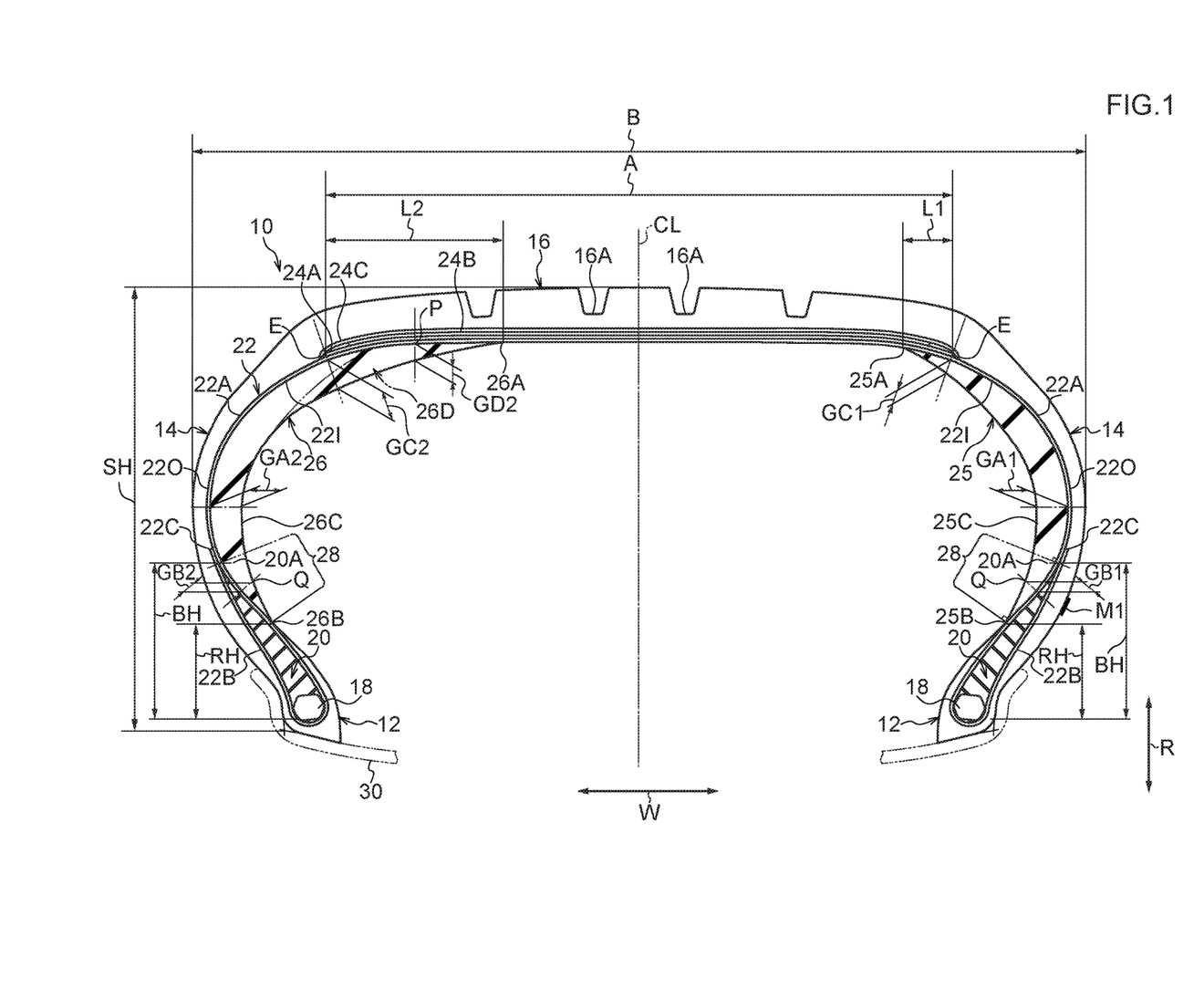
FIG. 1 is a tire half cross-section sectioned along the tire axial direction, illustrating a cross-section of a run-flat radial tire according to a first exemplary embodiment of technology of the disclosure.

FIG. 1 illustrates one side of a run-flat radial tire (referred to below as a "tire") 10 according to a first exemplary embodiment of technology of the disclosure, in cross-section sectioned along a tire axial direction. The arrow W in FIG. 1 indicates the axial direction of the tire 10 (referred to below as the "tire axial direction"), the arrow R indicates a radial direction of the tire 10 (referred to below as the "tire radial direction"), and the label CL indicates an equatorial plane of the tire 10 (referred to below as the "tire equatorial plane"). In the present exemplary embodiment, the side of the axis (axis of rotation) of the tire 10 in the tire radial direction is referred to as the "tire radial direction inner side", and the opposite side to the side of the axis of the tire 10 in the tire radial direction is referred to as the "tire radial direction outer side". The equatorial plane CL side of the tire 10 in the tire axial direction is referred to as the "tire axial direction inner side", and the opposite side to the equatorial plane CL side of the tire 10 in the tire axial direction is referred to as the "tire axial direction outer side".

FIG. 1 illustrates the tire 10 mounted to a standard rim 30 (illustrated by double-dotted intermittent lines in FIG. 1) when inflated to a standard air pressure. The standard rim referred to here is a rim specified in the 2013 edition of the Year Book of the Japan Automobile Tire Manufacturers Association (JATMA). The above standard air pressure is the air pressure corresponding to the maximum load capacity in the 2013 edition of the Year Book of the Japan Automobile Tire Manufacturers Association (JATMA).

Note that outer side of Japan, loading is to the maximum load (maximum load capacity) for a single wheel of the appropriate size as listed in the following Standards. The internal pressure is the air pressure corresponding the maximum load (maximum load capacity) for a single wheel listed in the following Standards. Moreover, the rim is a standard rim (or "Approved Rim", "Recommended Rim") of the appropriate size as listed in the following Standards. The Standard is determined according to the Industrial Standards prevailing in the region of tire manufacture or use, for example, as stipulated in "The Year Book of the Tire and Rim Association Inc." in the United States of America, in the "Standards Manual of the European Tyre and Rim Technical Organisation" in Europe, and in the "JATMA Year Book" of the Japan Automobile Tire Manufacturers Association in Japan.

Note that the tire 10 of the present exemplary embodiment may be any tire with a tire cross-section height of 115 mm or greater, for example 153 mm.

As illustrated in FIG. 1, the tire 10 according to the present exemplary embodiment includes a pair of bead portions 12, a pair of tire side portions 14 respectively extending from the pair of bead portions 12 toward the tire radial direction outer side, and a tread portion 16 extending from one tire side portion 14 to the other tire side portion 14. The tire side portions 14 bear load applied to the tire 10 during run-flat running.

Respective bead cores 18 are embedded in the pair of bead portions 12. A carcass 22 spans between the pair of bead cores 18. End portion sides of the carcass 22 are anchored to the bead cores 18. Note that the end portion sides of the carcass 22 are folded back around the bead cores 18 from the tire inner side toward the tire outer side, and anchored thereto. End portions 22C of folded-back portions 22B contact a carcass main body portion 22A. The carcass 22 extends from one bead core 18 to the other bead core 18 in a toroidal shape, and configures a tire frame.

At the tire radial direction outer side of the carcass main body portion 22A, belt layers 24A, 24B are stacked from the tire radial direction inner side. A cap layer 24C is stacked over the belt layers 24A, 24B. The respective belt layers 24A, 24B each have a general configuration in which plural steel cords are laid parallel to each other and coated with rubber, and the steel cords of the belt layer 24A and the steel cords of the second belt layer 24B are disposed inclined in opposite directions with respect to the equatorial plane CL so as to intersect each other. In contrast thereto, the cap layer 24C has a general configuration in which plural synthetic fibers rather than steel cords are laid parallel to each other along the tire circumferential direction and coated with rubber. Note that in the present exemplary embodiment, out of the belt layers 24A, 24B, the belt layer 24A that has the greater width in the tire axial direction corresponds to a maximum width inclined belt layer of the present invention.

The width of the maximum width inclined belt layer (belt layer 24A) in the tire width direction is preferably from 90% to 115% of a tread width. Here, the "tread width" means the tire axial direction width of a ground contact region under maximum load capacity in a state in which the tire 10 is fitted to the standard rim 30 with an internal pressure of the standard air pressure. The "maximum load capacity" referred to here indicates the maximum load capacity as listed in the 2013 edition of the Year Book by the Japan Automobile Tire Manufacturers Association (JATMA).

Bead filler 20 that extends from the respective bead cores 18 toward the tire radial direction outer side along an outer face 22O of the carcass 22 is embedded inner side each bead portion 12. The bead filler 20 is disposed in a region surrounded by the carcass main body portion 22A and the folded-back portion 22B. The bead filler 20 decreases in thickness on progression toward the tire radial direction outer side, and an end portion 20A at the tire radial direction outer side of the bead filler 20 enters into the tire side portion 14.

As illustrated in FIG. 1, a height BH of the bead filler 20 is preferably from 30% to 50% of a tire cross-section height SH, and is set to 39% thereof in the present exemplary embodiment.

Note that the "tire cross-section height" referred to herein means a length of ½ the difference between the tire external diameter and the rim diameter in a non-loaded state, as defined in the Year Book by the Japan Automobile Tire Manufacturers Association (JATMA). The "bead filler height BH" means a length measured along the tire radial direction from a lower end (tire radial direction inner side end portion) of the bead core 18 to the end portion 20A of the bead filler 20 in a state in which the tire 10 is fitted to the standard rim 30 and the internal pressure is the standard air pressure.

A mark M1 is applied to the tire side portion 14 to be at a vehicle mounting direction outer side such that, when the tire 10 is fitted to a vehicle, the tire 10 is mounted to the vehicle such that the mark M1 is at the outer side of the vehicle. A vehicle mounting direction outer side side-reinforcing rubber layer 25 that reinforces the tire side portion 14 at the vehicle mounting direction outer side is laid up at the tire width direction inner side of the carcass 22 located at the vehicle mounting direction outer side. A vehicle mounting direction inner side side-reinforcing rubber layer 26 that reinforces the tire side portion 14 at the vehicle mounting direction inner side is installed at the tire axial direction inner side of the carcass 22 located at the vehicle mounting direction inner side. The vehicle mounting direction outer side side-reinforcing rubber layer 25 and the vehicle mounting direction inner side side-reinforcing rubber layer 26 extend in the tire radial direction along an inner face 221 of the carcass 22. The vehicle mounting direction outer side side-reinforcing rubber layer 25 and the vehicle mounting direction inner side side-reinforcing rubber layer 26 are each formed in a shape that gradually decreases in thickness on progression toward the bead core 18 side and the tread portion 16 side, such as a substantially crescent shape. Note that "thickness of the vehicle mounting direction inner side side-reinforcing rubber layer" and "thickness of the vehicle mounting direction outer side side-reinforcing rubber layer" referred to herein each indicate a length measured along a normal line to the carcass 22 in a state in which the tire 10 has been fitted to the standard rim 30 and the internal pressure is the standard air pressure.

Note that the vehicle mounting direction outer side side-reinforcing rubber layer 25 and the vehicle mounting direction inner side side-reinforcing rubber layer 26 are reinforcing rubber to enable running for a specific distance in a state in which the weight of the vehicle and its occupant(s) is supported when the internal pressure of the tire 10 has decreased, such as due to puncturing.

The vehicle mounting direction outer side side-reinforcing rubber layer 25 and the vehicle mounting direction inner side side-reinforcing rubber layer 26 are formed such that respective end portions 25A, 26A on the tread portion 16 side overlap the belt layer 24A with the carcass 22 (carcass main body portion 22A) interposed therebetween, and respective end portions 25B, 26B on the bead core 18 side overlap the bead filler 20 with the carcass 22 interposed therebetween. The reference numeral 25C refers to an inner face of the vehicle mounting direction outer side side-reinforcing rubber layer 25, and the reference numeral 26C refers to an inner face of the vehicle mounting direction inner side side-reinforcing rubber layer 26.

Figure 2:
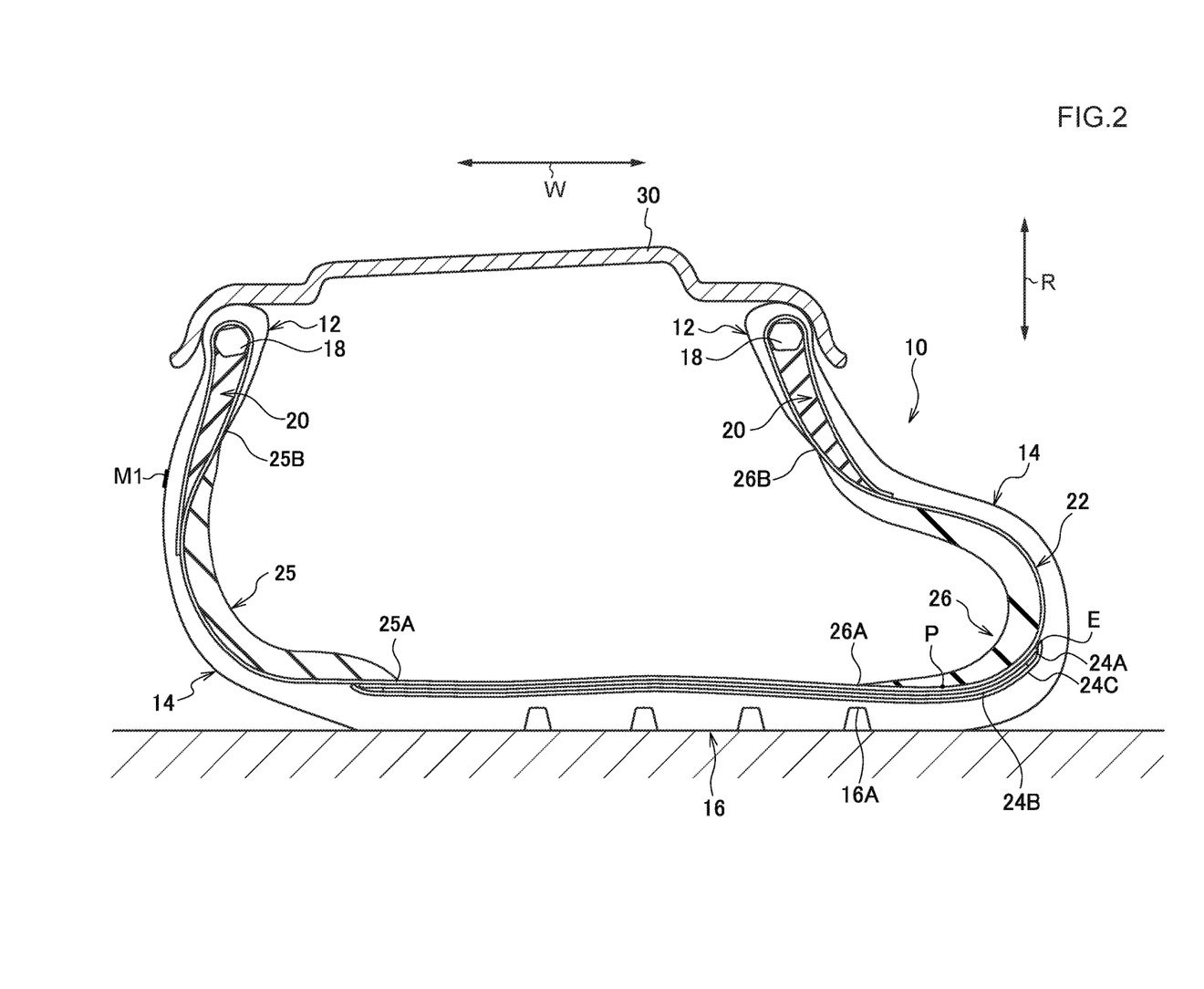
FIG. 2 is a tire cross-section sectioned along the tire axial direction, illustrating the run-flat radial tire in FIG. 1 in a state in which a tire side portion has buckled.

The tire radial direction outer side end portion 26A of the vehicle mounting direction inner side side-reinforcing rubber layer 26 is closer along the tire axial direction to the tire equatorial plane CL than the tire radial direction outer side end portion 25A of the vehicle mounting direction outer side side-reinforcing rubber layer 25. This sufficiently improves rigidity in regions of the vehicle mounting direction outer side side-reinforcing rubber layer 25 and the vehicle mounting direction inner side side-reinforcing rubber layer 26 close to tread end portions, and particularly in a region of the vehicle mounting direction inner side side-reinforcing rubber layer 26 close to the tread end portion, suppressing buckling of the tire side portion and improving rim detachment prevention performance. A triangular shaped location 26D of the vehicle mounting direction inner side side-reinforcing rubber layer 26 further toward the tire equatorial plane CL side than the double-dotted dashed line in FIG. 2 is not present in the vehicle mounting direction outer side side-reinforcing rubber layer 25, thereby enabling an unnecessary increase in the weight of the tire 10 to be prevented.

At the tire tread portion, a ratio L2/L1, of an overlap width L1 in the tire axial direction between the belt layer (maximum width inclined belt layer) 24A and the vehicle mounting direction outer side side-reinforcing rubber layer 25, and an overlap width L2 in the tire axial direction between the belt layer 24A and the vehicle mounting direction inner side side-reinforcing rubber layer 26, is set to 15/14 or greater.

The overlap width L1 and the overlap width L2 may each be set to 15% of the tire axial direction width of the belt layer 24A or greater.

The overlap width L1 may be set from 5% to 14% of the tire axial direction width of the belt layer 24A, the overlap width L2 may be set from 5% to 40% of the tire axial direction width of the belt layer 24A.

A thickness GC1 of the vehicle mounting direction outer side side-reinforcing rubber layer 25 at a tire axial direction end portion E of the belt layer 24A, this being the maximum width inclined belt layer, is thinner than a maximum thickness GA1, is preferably 20% of the maximum thickness GA1 or greater, and is set to 50% thereof in the present exemplary embodiment.

A thickness GC2 of the vehicle mounting direction inner side side-reinforcing rubber layer 26 at a tire axial direction end portion E of the belt layer 24A, this being the maximum width inclined belt layer, is thinner than a maximum thickness GA2, is preferably 50% of the maximum thickness GA2 or greater, and is set to 60% thereof in the present exemplary embodiment.

A thickness GD2 of the vehicle mounting direction inner side side-reinforcing rubber layer 26 at a position P located 14% of the tire cross-section height SH to the tire axial direction inner side of the respective tire axial direction end portion E of the belt layer 24A is thinner than the maximum thickness GA2, and is preferably 30% of the maximum thickness GA2 or greater, and is set to 10% thereof in the present exemplary embodiment.

The thickness of the vehicle mounting direction outer side side-reinforcing rubber layer 25 gradually decreases on progression toward the bead core 18 side and the tread portion 16 side, and a thickness GB1 at a center point Q of an overlap portion 28 along an extension direction of the carcass 22 is preferably 50% of the thickness GA1 of the side-reinforcing rubber layer 26 at the maximum width position of the carcass 22 or less, and is set to 50% thereof in the present exemplary embodiment.

The thickness of the vehicle mounting direction inner side side-reinforcing rubber layer 26 gradually decreases on progression toward the bead core 18 side and the tread portion 16 side, and a thickness GB2 at a center point Q of an overlap portion 28 is preferably 50% of the thickness GA2 of the side-reinforcing rubber layer 26 at the maximum width position of the carcass 22 or less, and is set to 50% thereof in the present exemplary embodiment.

The "maximum width position of the carcass" refers to the position where the carcass 22 reaches furthest to the tire axial direction outer side.

A tire radial direction distance RH from the lower ends (tire radial direction inner side end portion) of the respective bead cores 18 to the end portion 25B of the vehicle mounting direction outer side side-reinforcing rubber layer 25 and the end portion 26B of the vehicle mounting direction inner side side-reinforcing rubber layer 26 is preferably between 30% and 80% of the bead filler height BH, and is set to 38% thereof in the present exemplary embodiment.

The "tire radial direction distance RH" refers to a length measured along the tire radial direction from the lower ends (tire radial direction inner side end portions) of the respective bead cores 18 to the end portion 25B of the vehicle mounting direction outer side side-reinforcing rubber layer 25 and the end portion 26B of the vehicle mounting direction inner side side-reinforcing rubber layer 26 in a state in which the tire 10 is fitted to the standard rim 30 and the internal pressure is the standard air pressure.

The thickness GB1 of the vehicle mounting direction outer side side-reinforcing rubber layer 25 at the center point Q between the end portion 20A of the bead filler 20 and the end portion 25B of the vehicle mounting direction outer side side-reinforcing rubber layer 25 in the extension direction of the carcass 22 is preferably 50% of the thickness GA1 (also referred to below as the "maximum thickness GA1") of the vehicle mounting direction outer side side-reinforcing rubber layer 25 at the maximum width position of the carcass 22 or less, and is set to 53% thereof in the present exemplary embodiment.

As illustrated in FIG. 1, the thickness GB2 of the vehicle mounting direction inner side side-reinforcing rubber layer 26 at the center point Q between the end portion 20A of the bead filler 20 and the end portion 26B of the vehicle mounting direction inner side side-reinforcing rubber layer 26 in the extension direction of the carcass 22 is preferably 50% of the thickness GA2 (also referred to below as the "maximum thickness GA2") of the vehicle mounting direction inner side side-reinforcing rubber layer 26 at the maximum width position of the carcass 22 or less, and is set to 43% thereof in the present exemplary embodiment.

The tread portion 16 is formed with plural circumferential direction grooves 16A extending around the tire circumferential direction. At an inner face of the tire 10, an inner liner with a main component of butyl rubber is laid up spanning from one bead portion 12 to the other bead portion 12. Note that the inner liner may have a main component of resin.

There is no rim guard provided in the present exemplary embodiment since the tire 10 has a high tire cross-section height that is a tire cross-section height of 115 mm or greater; however, a rim guard may be provided.

Next, explanation follows regarding effects of the tire 10 of the present exemplary embodiment.

First, simple explanation follows regarding a mechanism of rim detachment in the tire 10.

Normally during run-flat running, if a slip angle is applied to a tire, for example due to turning, a ground contact portion of the tire is squashed, distortion of the tire increases, and a belt diameter of a tread-in portion of the tire becomes larger. As a result, tensile force toward the tire radial direction outer side acting on the bead portion positioned at the turn inner side becomes larger at a tread-in position, and, together with buckling occurring at the tread-in position of the tire side portion positioned at the vehicle turn inner side, the bead portion sometimes detaches from the standard rim (rim detachment).

Figure 4:
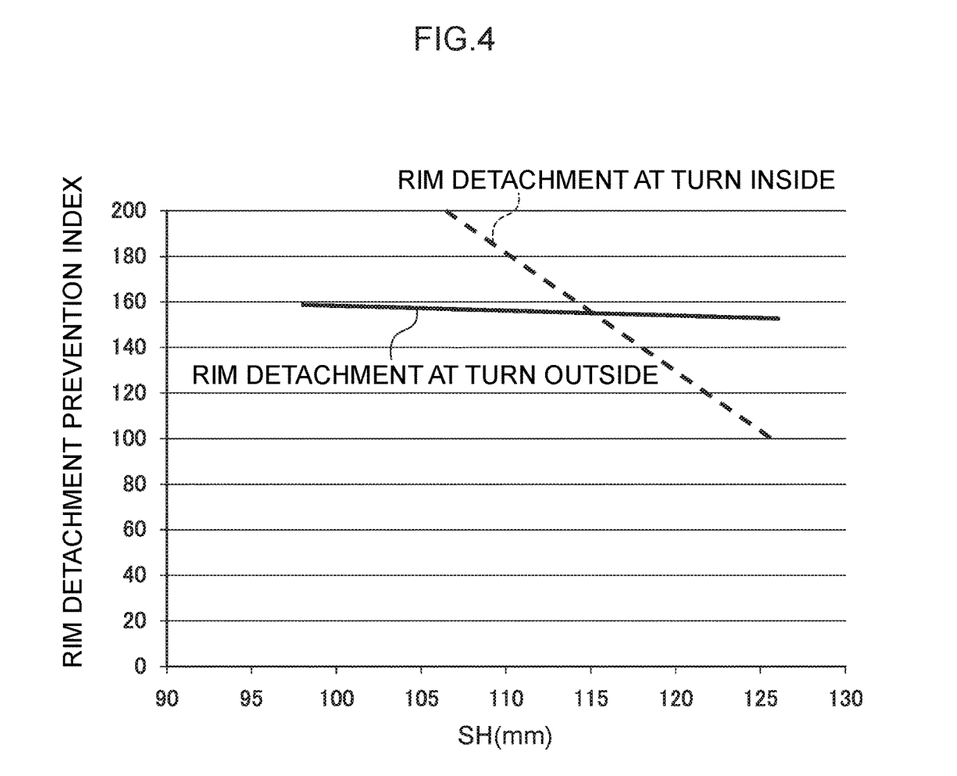
FIG. 4 is a graph illustrating a relationship between tire cross-section height and rim detachment prevention performance in run-flat tires.

As illustrated in FIG. 4, it has been confirmed that rim detachment at the vehicle turn inner side is more liable to occur for in tires having a tire cross-section height SH of 115 mm or greater. The graph illustrated in FIG. 4 is from an investigation into a rim detachment prevention index against tire cross-section height SH, employing run-flat radial tires with a tire width of 235 mm while varying the tire cross-section height SH. The higher the numerical value shown in the rim detachment prevention index, the less liable rim detachment is to occur. According to FIG. 4, while rim detachment is more liable to occur at the turn outer side than at the turn inner side of a tire in tires having a tire cross-section height SH of less than 115 mm, it is apparent that it is important to suppress rim detachment at the turn inner side in tires with a tire cross-section height SH of 115 mm or greater. Note that the tire cross-section height is specifically 250 mm or lower, and in particular 155 mm or lower.

However, in the tire 10 according to the present exemplary embodiment, the tire radial direction outer side end portion 26A of the vehicle mounting direction inner side side-reinforcing rubber layer 26 is closer to the tire equatorial plane CL than the tire radial direction outer side end portion 25A of the vehicle mounting direction outer side side-reinforcing rubber layer 25 (see FIG. 1). Accordingly, even when a slip angle is applied during run-flat running, since the rigidity at the position P located 14% of the tire cross-section height SH to the tire axial direction inner side of the respective tire axial direction end portion E of the load-supporting belt layer 24A is increased by the vehicle mounting direction inner side side-reinforcing rubber layer 26, bending of the belt layer 24A is suppressed close to the position P (see FIG. 2). The occurrence of buckling in the tire side portion 14 is accordingly suppressed, enabling rim detachment prevention performance to be improved.

Making only the tire radial direction outer side end portion 26A of the vehicle mounting direction inner side side-reinforcing rubber layer 26 closer to the tire equatorial plane CL and not the tire radial direction outer side end portion 25A of the vehicle mounting direction outer side side-reinforcing rubber layer 25 enables an unnecessary increase in the weight of the tire 10 to be prevented.

Namely, a tire such as the tire 10 of the present exemplary embodiment, in which the height (length along the tire radial direction) of the tire side portions 14 is high, for example a tire with a tire cross-section height of 115 mm or greater, is liable to buckle at the tire side portion 14. Thus, making only the tire radial direction outer side end portion 26A of the vehicle mounting direction inner side side-reinforcing rubber layer 26 closer to the tire equatorial plane CL and not the tire radial direction outer side end portion 25A of the vehicle mounting direction outer side side-reinforcing rubber layer 25 in the tire 10 with a tire cross-section height of 115 mm or greater enables rim detachment prevention performance to be improved, while suppressing an unnecessary increase in weight.

Moreover, at the tire tread portion, the ratio L2/L1 of the overlap width L1 in the tire axial direction between the belt layer (maximum width inclined belt layer) 24A and the vehicle mounting direction outer side side-reinforcing rubber layer 25, and the overlap width L2 in the tire axial direction between the belt layer 24A and the vehicle mounting direction inner side side-reinforcing rubber layer 26, is set to 15/14 or greater. This sufficiently improves rigidity in the regions close to the tread end portions, and particularly the region at the vehicle mounting direction inner side, enabling buckling of the tire side portion to be suppressed and rim detachment prevention performance to be improved, without having a negative impact on run-flat durability performance.

Moreover, setting each of the overlap widths L1, L2 to 15% of the tire axial direction width of the belt layer 24A or greater sufficiently improves rigidity in the regions close to the tread end portions, and particularly the region at the vehicle mounting direction inner side, enabling buckling of the tire side portion to be suppressed and rim detachment prevention performance to be improved, without having a negative impact on run-flat durability performance.

By setting the overlap width L1 to from 5% to 14% of the tire axial direction width of the belt layer 24A, and the overlap width L2 to from 5% to 40% of the tire axial direction width of the belt layer 24A, an unnecessary increase in weight is suppressed, and a good balance of improved rim detachment prevention performance and improved run-flat durability performance is achieved. The overlap width L2 in particular is preferably set from 15% to 40% of the tire axial direction width of the belt layer 24A.

In cases in which the overlap width L2 in the tire axial direction between the belt layer 24A and the vehicle mounting direction inner side side-reinforcing rubber layer 26 is less than 5% of the tire axial direction width of the belt layer 24A, there is a negative effect on rim detachment prevention performance and run-flat durability performance, and in cases in which the overlap width L2 is greater than 40% of the tire axial direction width of the belt layer 24A, there is an unnecessary increase in weight. In cases in which the overlap width L1 in the tire axial direction between the belt layer 24A and the vehicle mounting direction outer side side-reinforcing rubber layer 25 is less than 5% of the tire axial direction width of the belt layer 24A, there is a negative effect on rim detachment prevention performance and run-flat durability performance, and in cases in which the overlap width L1 is greater than 14% of the tire axial direction width of the belt layer 24A, there is an unnecessary increase in weight.

In the tire 10, since the end portion 25B of the vehicle mounting direction outer side side-reinforcing rubber layer 25 and the end portion 26B of the vehicle mounting direction inner side side-reinforcing rubber layer 26 each overlap the bead filler 20 with the carcass 22 interposed therebetween, the rigidity of the tire side portions 14 is increased, improving run-flat durability performance.

In the present exemplary embodiment, configuration is made in which the end portion sides of the carcass 22 are folded back around the bead cores 18 from the tire axial direction inner side toward the tire axial direction outer side, and the end portions of the carcass 22 are anchored to the bead cores 18. However, the present invention is not limited to this configuration, and, for example, configuration may be made in which each bead core 18 is divided into halves, and the end portion sides of the carcass 22 are sandwiched between the bead core 18 halves to anchor the end portions of the carcass 22 to the bead cores 18.

In the present exemplary embodiment, configuration is made in which the vehicle mounting direction outer side side-reinforcing rubber layer 25 and the vehicle mounting direction inner side side-reinforcing rubber layer 26 are each configured from a single type of rubber. However, fillers, short fibers, resins, or the like may also be contained, as long as rubber is the main component.

The vehicle mounting direction outer side side-reinforcing rubber layer 25 and the vehicle mounting direction inner side side-reinforcing rubber layer 26 may each be configured from plural types of rubber. For example, the vehicle mounting direction outer side side-reinforcing rubber layer 25 and the vehicle mounting direction inner side side-reinforcing rubber layer 26 may each be configured by layering plural different types of rubber in the tire radial direction or in the tire axial direction.

Note that the vehicle mounting direction outer side side-reinforcing rubber layer 25 and the vehicle mounting direction inner side side-reinforcing rubber layer 26 of the present exemplary embodiment may each employ another material instead of rubber. For example, a thermoplastic resin could conceivably be employed.

Moreover, in cases in which the carcass 22 has plural layers, vehicle mounting direction outer side side-reinforcing rubber layers 25 and vehicle mounting direction inner side side-reinforcing rubber layers 26 may be provided at plural locations between the layers of the carcass 22, and between the carcass 22 and an inner liner.

Other Exemplary Embodiments

Figure 3:
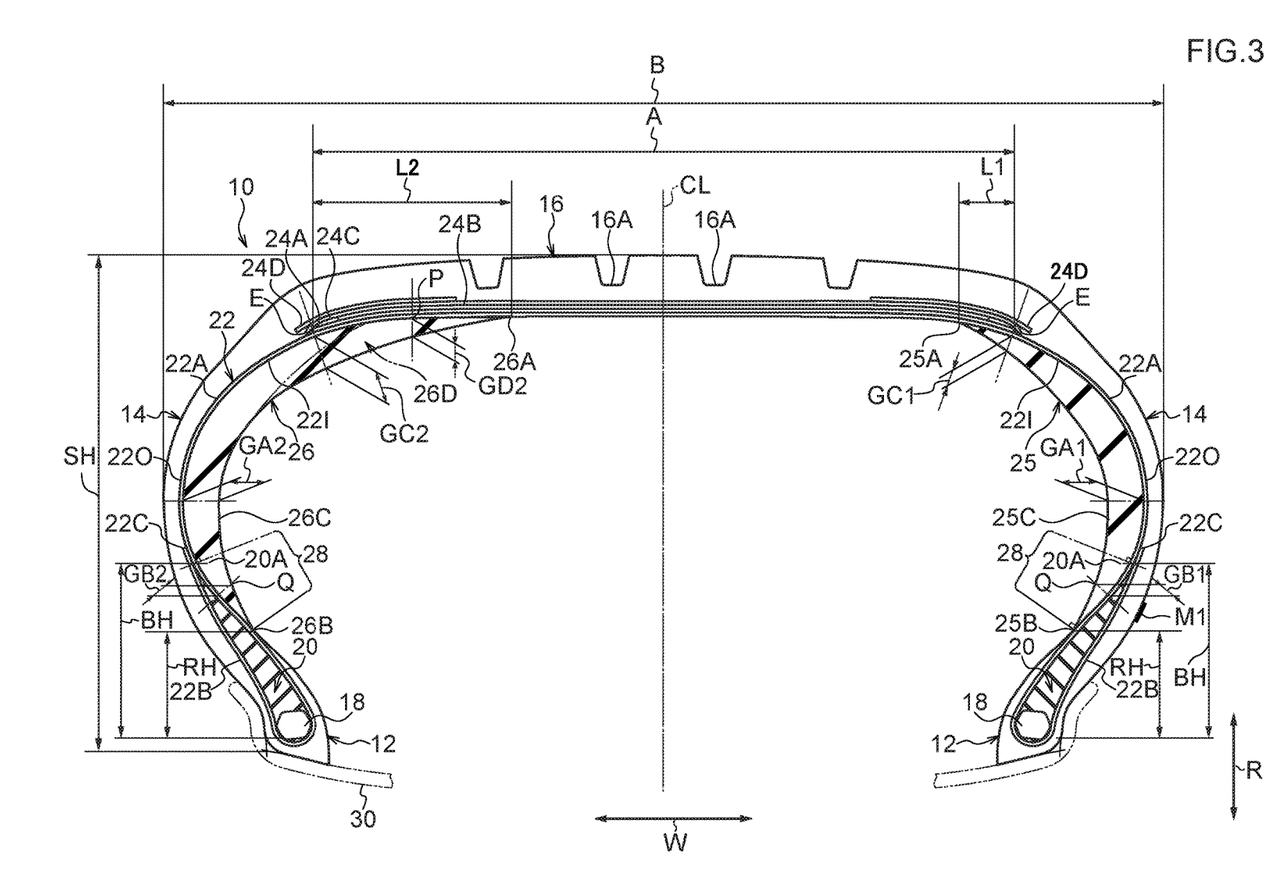
FIG. 3 is a tire half cross-section sectioned along the tire axial direction, illustrating a cross-section of a run-flat radial tire according to a second exemplary embodiment of technology of the disclosure.

As in a second exemplary embodiment illustrated in FIG. 3, at the tire radial direction outer side of the carcass 22, a reinforcing cord layer 24D configured by a layer of rubber-coated cord may be provided so as to cover an upper portion of each shoulder portion (tire axial direction end portion) of the belt layers 24A, 24B and the cap layer 24C. The cord configuring the reinforcing cord layer 24D is preferably provided inclined in a range of from 60° to 90° with respect to the tire circumferential direction. Adding such a reinforcing cord layer 24D increases the bending rigidity in close to the position P located 14% of tire cross-section height SH to the tire axial direction inner side of the tire axial direction end portion E of the belt layer 24A and the like, thereby enabling buckling of the tire side portion 14 to be further suppressed.

Note that providing plural reinforcing cord layers would enhance the above advantageous effect. However, since this would increase the weight of the tire, a single reinforcing cord layer is employed in the present exemplary embodiment.

Although rubber members employed as the tire side portions 14 at the tire axial direction outer sides of the carcass 22 are not specified in the present exemplary embodiment, they may, for example, include rubber having the physical properties of a JIS hardness (at 20° C.) of from 70 to 85, and a loss coefficient tan δ (at 60° C.) of 0.10 or lower.

Explanation has been given regarding exemplary embodiments of the present invention; however, the present invention is not limited to such exemplary embodiments, and various configurations may be implemented within a range not departing from the spirit of the present invention.

TEST EXAMPLES

In order to confirm the advantageous effects of the technology of the disclosure, ten variations of a run-flat radial tire (referred to below simply as "tire") incorporating the present invention (Examples 1 to 10 below), and two variations of run-flat radial tires of comparative examples (Comparative Examples 1 and 2 below) that did not incorporate the present invention are prepared, and the following tests are performed.

Explanation first follows regarding the run-flat radial tires of Examples 1 to 10 and the run-flat radial tires of Comparative Examples 1 and 2 employed in testing. Each of the run-flat radial tires employed in testing has a size of 235/65R17 and a tire cross-section height of 153 mm.

A similar structure to the structure of the tire 10 of the exemplary embodiments described above is employed for each of the run-flat radial tires of Examples 1 to 10. The run-flat radial tires of Examples 1 to 10 are tires in which "a ratio L2/L1, of an overlap width L1 between a maximum width inclined belt and a vehicle mounting outer side side-reinforcing rubber layer, and an overlap width L2 between the maximum width inclined belt and a vehicle mounting inner side side-reinforcing rubber layer, is set to 15/14 or greater".

The run-flat radial tires of Examples 1 to 10 are also tires in which "the overlap width L1 between the maximum width inclined belt and the vehicle mounting outer side side-reinforcing rubber layer is from 4% to 15%" and "the overlap width L2 between the maximum width inclined belt and the vehicle mounting inner side side-reinforcing rubber layer is from 14% to 41%".

The run-flat radial tires of Examples 3 to 7 are tires in which "the overlap width L1 is from 5% to 14%" and "the overlap width L2 is from 14% to 40%).

The run-flat radial tires of Comparative Examples 1 and 2 has the same structure as the run-flat radial tires of Examples 1 to 10, but are tires having overlap widths L1, L2 not incorporated in the present invention. Namely, the tires are configured such that the same side-reinforcing rubber layer as that used in the vehicle mounting direction outer side side-reinforcing rubber layer 25 is used as a vehicle mounting direction inner side side-reinforcing rubber layer 25, but other configuration is the same as in the tire 10.

During testing, first, the test tires are fitted to a standard rim as specified by JATMA, mounted to a vehicle without being inflated with air (at an internal pressure of 0 kPa), and run-in for a distance of 5 km at a speed of 20 km/h. Then, the test tires are introduced at a specific speed to a curving road having a radius of curvature of 25 m, and stopped at a position of ⅓ of a lap of the curving road, with this repeated twice in succession (a J-turn test). The J-turn test is then repeated with the speed of introduction raised by 2 km/h each time, and the turning acceleration when a bead portion detached from the rim (rim hump) is measured.

The turning acceleration when a bead portion of Example 1 detached from the rim was taken as a reference value (100), and the turning accelerations when each of the bead portions of Comparative Examples 1 and 2 and Examples 2 to 10 detached from the rim are expressed as an index and evaluated. The "rim detachment prevention performance" in Table 1 expresses as an index the turning acceleration when rim detachment occurred for each bead portion. The higher the numerical value of the rim detachment prevention performance, the better the result indicated (the less liable rim detachment is to occur).

For run-flat durability performance (RF durability performance), a state is envisaged in which the internal pressure is 0 kPa due to puncturing, and the test tires are run continuously at a speed of 80 km/h (50 mph: ISO conditions) with an air valve in an open state and a load of 5.7 kN applied to a drum test machine. The distance traveled until failure occurred is measured. The run-flat durability performance of Example 1 was taken as a reference value (100), and the run-flat durability performances of Comparative Examples 1 and 2 and Examples 2 to 10 are expressed as an index and evaluated. Note that the "run-flat durability performance" in Table 1 is the distance traveled expressed as an index. The larger the value for run-flat durability performance, the better the result indicated.

For tire weight (weight), the tire weight of Example 1 was taken as a reference value (100), and the tire weights of Comparative Examples 1 and 2 and Examples 2 to 10 are expressed as an index and evaluated. Note that the "tire weight" in Table 1 is the tire weight expressed as an index. The smaller the numerical value of the tire weight, the better the result indicated.

The respective numerical values for Examples 1 to 10 and Comparative Examples 1 and 2 are shown in Table 1. The test results other than Example 1 shown in Table 1 are prophetic examples based on predictions the basis of past findings.

in the tire radial direction along an inner face of the carcass, a tire radial direction outer side end portion, which contacts with the carcass and that is a closest portion to a tire equatorial plane, of the vehicle mounting direction inner side side-reinforcing rubber layer

TABLE 1

|  | Comparative Example 1 | Comparative Example 2 | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Overlap width (L1) between maximum width inclined belt layer and vehicle mounting outer side side-reinforcing rubber layer | 4% | 5% | 4% | 4% | 5% | 5% | 5% | 14% | 14% | 14% | 15% | 15% |
| Overlap width (L2) between maximum width inclined belt layer and vehicle mounting inner side side-reinforcing rubber layer | 4% | 5% | 14% | 15% | 14% | 15% | 40% | 15% | 40% | 41% | 40% | 41% |
| Rim detachment prevention performance | 91 | 92 | 100 | 102 | 100 | 102 | 123 | 102 | 123 | 125 | 123 | 125 |
| Run-flat durability performance | 95 | 96 | 100 | 100 | 101 | 101 | 101 | 102 | 103 | 100 | 103 | 100 |
| Tire weight | 99 | 99 | 100 | 100 | 100 | 100 | 102 | 101 | 102 | 103 | 103 | 104 |

As shown in Table 1, it is confirmed that rim detachment prevention performance and run-flat durability performance improved while an unnecessary increase in weight is suppressed in Examples 1 to 10, due to the ratio L2/L1 of the overlap width L1 and the overlap width L2 being 15/14 or greater, the overlap width L1 being from 4% to 15%, and the overlap width L2 being from 14% to 41%. Note that when L2/L1 is less than 15/14, the advantageous effect of suppressing an unnecessary increase in weight is reduced.

It is also confirmed that an unnecessary increase in weight is suppressed, and a good balance of improved rim detachment prevention performance and improved run-flat durability performance is achieved in Examples 3 to 7, due to the ratio L2/L1 of the overlap width L1 and the overlap width L2 being 15/14 or greater, the overlap width L1 being from 5% to 14%, and the overlap width L2 being from 14% to 40%.

It is also confirmed that rim detachment prevention performance and run-flat durability performance improved while an unnecessary increase in weight is suppressed in Examples 9 and 10, due to the ratio L2/L1 of the overlap width L1 and the overlap width L2 being 8/3 or greater, and the overlap widths L1, L2 being 15% or greater. Note that in Comparative Example 2, rim detachment prevention performance improved by 1 point compared to Comparative Example 1, due to the overlap width L1 being increased by 1% compared to Comparative Example 1. Moreover, in Comparative Example 2, run-flat durability performance also improved by 1 point compared to Comparative Example 1, due to the overlap widths L1, L2 each being increased by 1% compared to Comparative Example 1.

The invention claimed is:

1. A run-flat radial tire comprising:
   a carcass spanning between a pair of bead portions;
   a vehicle mounting direction outer side side-reinforcing rubber layer that is provided at a tire side portion at a vehicle mounting direction outer side and that extends in a tire radial direction along an inner face of the carcass;
   a vehicle mounting direction inner side side-reinforcing rubber layer that is provided at a tire side portion at a vehicle mounting direction inner side and that extends in the tire radial direction along an inner face of the carcass, a tire radial direction outer side end portion, which contacts with the carcass and that is a closest portion to a tire equatorial plane, of the vehicle mounting direction inner side side-reinforcing rubber layer being closer to the tire equatorial plane than a tire radial direction outer side end portion, which contacts with the carcass that is a closest portion to the tire equatorial plane, of the vehicle mounting direction outer side side-reinforcing rubber layer; and
   a tire tread portion that connects the tire side portion at the vehicle mounting direction inner side and the tire side portion of the vehicle mounting direction outer side,
   wherein:
   a tire cross-section height of the run-flat radial tire is 115 mm or more than 115 mm, and
   the tire radial direction outer side end portion of the vehicle mounting direction inner side side-reinforcing rubber layer and a circumferential direction groove that is innermost in the vehicle mounting direction among circumferential direction grooves that are formed on the tire tread portion are overlapped in the tire radial direction.

2. The run-flat radial tire of claim 1, further comprising:
   a maximum width inclined belt layer that is provided at the tire tread portion at a tire radial direction outer side of the carcass, that includes a cord extending in a direction inclined with respect to a tire circumferential direction, and that is a belt layer having a largest width in a tire axial direction, wherein
   a ratio L2/L1, of an overlap width L1 in the tire axial direction between the maximum width inclined belt layer and the vehicle mounting direction outer side side-reinforcing rubber layer and an overlap width L2 in the tire axial direction between the maximum width inclined belt layer and the vehicle mounting direction inner side side-reinforcing rubber layer, is set to 15/14 or greater.

3. The run-flat radial tire of claim 1, further comprising:
   a maximum width inclined belt layer that is provided at the tire tread portion at a tire radial direction outer side of the carcass, that includes a cord extending in a direction inclined with respect to a tire circumferential direction, and that is a belt layer having a largest width in a tire axial direction, wherein
   an overlap width L1 in the tire axial direction between the maximum width inclined belt layer and the vehicle mounting direction outer side side-reinforcing rubber layer, and an overlap width L2 in the tire axial direction between the maximum width inclined belt layer and the vehicle mounting direction inner side side-reinforcing rubber layer are each 15% or more than 15% of the tire axial direction width of the maximum width inclined belt layer.

4. The run-flat radial tire of claim 1, further comprising:
a maximum width inclined belt layer that is provided at the tire tread portion at a tire radial direction outer side of the carcass, that includes a cord extending in a direction inclined with respect to a tire circumferential direction, and that is a belt layer having a largest width in a tire axial direction, wherein
an overlap width L1 in the tire axial direction between the maximum width inclined belt layer and the vehicle mounting direction outer side side-reinforcing rubber layer is from 5% to 14% of the tire axial direction width of the maximum width inclined belt layer, and an overlap width L2 in the tire axial direction between the maximum width inclined belt layer and the vehicle mounting direction inner side side-reinforcing rubber layer is from 5% to 40% of the tire axial direction width of the maximum width inclined belt layer.

\* \* \* \* \*